(12) United States Patent
Craig et al.

(10) Patent No.: US 7,367,633 B2
(45) Date of Patent: May 6, 2008

(54) BRAKING SYSTEM

(75) Inventors: William C Craig, Endicott, NY (US); Patrick J Fitzgibbons, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/458,137

(22) Filed: Jul. 18, 2006

(65) Prior Publication Data

US 2008/0001470 A1    Jan. 3, 2008

Related U.S. Application Data

(63) Continuation of application No. 11/421,523, filed on Jun. 1, 2006.

(51) Int. Cl.
*B60K 17/00* (2006.01)

(52) U.S. Cl. .................. 303/3; 303/155; 180/370

(58) Field of Classification Search ........... 303/122.19, 303/3, 7, 20, 15, 155; 180/197, 65.7, 65.8, 180/370; 701/70
See application file for complete search history.

(56) References Cited

U.S. PATENT DOCUMENTS

| 2,959,449 A | 11/1960 | Lazich |
| 3,582,150 A | 6/1971 | Williams |
| 3,680,314 A | 8/1972 | Toomey |
| 3,809,191 A | 5/1974 | Woodward |
| 4,310,078 A | 1/1982 | Shore |
| 4,344,139 A | 8/1982 | Miller et al. |
| 4,361,871 A | 11/1982 | Miller et al. |
| 4,422,695 A | 12/1983 | Farr |
| 4,521,856 A | 6/1985 | Phelps et al. |
| 4,667,760 A | 5/1987 | Takimoto |
| 4,812,777 A | 3/1989 | Shirai |
| 5,085,457 A | 2/1992 | Young |
| 5,302,008 A | 4/1994 | Mirake et al. |
| 5,505,481 A | 4/1996 | VanDengerg et al. |
| 5,573,312 A | 11/1996 | Muller et al. |
| 5,704,632 A | 1/1998 | Lee |
| 5,804,935 A * | 9/1998 | Radev .................. 318/139 |

(Continued)

FOREIGN PATENT DOCUMENTS

DE    3140492 A    6/1982

(Continued)

OTHER PUBLICATIONS

Notice of Allowance dated Jul. 24, 2007 for U.S. Appl. No. 11/421,523.

(Continued)

*Primary Examiner*—Chris Schwartz
(74) *Attorney, Agent, or Firm*—James T. Carmichael; Miles & Stockbridge P.C.

(57) ABSTRACT

Disclosed is a redundant braking system for a vehicle. A controller may monitor a status of a hydraulic braking system, and during vehicle travel, automatically switch to a modulated electric braking system which is separate from the hydraulic braking system when the hydraulic braking system fails. The modulated electric braking system may utilize a brake acting on a drive shaft of the vehicle, and an operator-actuated switch may set a mode of the modulated electric braking system to a non-modulated parking brake mode.

13 Claims, 3 Drawing Sheets

U.S. PATENT DOCUMENTS

| | | | |
|---|---|---|---|
| 5,992,576 | A | 11/1999 | Berg et al. |
| 6,005,358 | A | 12/1999 | Radev |
| 6,019,436 | A | 2/2000 | Siepker |
| 6,251,037 | B1 | 6/2001 | Baumgaertner et al. |
| 6,358,174 | B1 | 3/2002 | Folsom et al. |
| 6,455,947 | B1 | 9/2002 | Lilley et al. |
| 6,461,267 | B1* | 10/2002 | Paielli ............ 475/150 |
| 6,488,344 | B2 | 12/2002 | Huls et al. |
| 6,582,030 | B2 | 6/2003 | Harris |
| 6,598,943 | B2 | 7/2003 | Harris |
| 6,626,270 | B2* | 9/2003 | Drennen et al. ........ 188/72.1 |
| 6,626,271 | B1 | 9/2003 | Bohm et al. |
| 6,647,328 | B2* | 11/2003 | Walker ............ 701/36 |
| 6,726,592 | B2 | 4/2004 | Kotani |
| 6,796,399 | B2* | 9/2004 | Satou et al. ............ 180/370 |
| 6,820,946 | B2 | 11/2004 | Salamat et al. |
| 6,824,228 | B2 | 11/2004 | Harris et al. |
| 6,923,293 | B1 | 8/2005 | James |
| 6,959,971 | B2* | 11/2005 | Tsunehara ............ 303/152 |
| 7,008,025 | B2 | 3/2006 | McCann |
| 7,127,337 | B2 | 10/2006 | Bennett et al. |
| 2001/0003401 | A1* | 6/2001 | Vikman et al. ............ 303/20 |
| 2001/0041959 | A1* | 11/2001 | Satou et al. ............ 701/70 |
| 2002/0109403 | A1 | 8/2002 | Yamamoto et al. |
| 2002/0116101 | A1* | 8/2002 | Hashiba et al. ............ 701/22 |
| 2003/0064854 | A1 | 4/2003 | Kotani |
| 2003/0158012 | A1 | 8/2003 | Kwoka |
| 2004/0251095 | A1 | 12/2004 | Simard et al. |
| 2005/0032598 | A1 | 2/2005 | Hanyu et al. |
| 2005/0146208 | A1 | 7/2005 | Wattenburg et al. |
| 2005/0269875 | A1* | 12/2005 | Maki et al. ............ 303/152 |
| 2005/0285442 | A1* | 12/2005 | Tsukasaki ............ 303/186 |
| 2006/0138741 | A1 | 6/2006 | Dare-Bryan |
| 2006/0152078 | A1* | 7/2006 | Bald ............ 303/155 |

FOREIGN PATENT DOCUMENTS

| | | |
|---|---|---|
| FR | 1133596 | 3/1957 |
| FR | 1202376 | 1/1960 |
| GB | 580 065 | 8/1946 |
| GB | 988 199 | 4/1965 |
| GB | 1375339 | 11/1974 |
| GB | 2207646 A | 2/1989 |
| GB | 2236287 A | 4/1991 |

OTHER PUBLICATIONS

U.S. Appl. No. 11/421,523, filed Jun. 1, 2006, Craig et al.
U.S. Appl. No. 11/458,137, filed Jul. 18, 2006, Craig et al.
Lockheed Martin Delivers Lightweight Prime Mover Vehicles to the U.S. Marine Corps, Owego, NY, Press Released dated Feb. 21, 2007.
"Wherever you find heavy "Stop and Go" Brake Applications you'll find Telma Retarders", www.industrialautomatic.com/html/telma1.htm, 2 pgs.
Control System, winches-aust.com/WEBPAGES/telma/pages/Control%20system%202.htm, 2 pgs.
"What is a Frenelsa Electrical Retarder?", www.frenelsa.com/ingles/f_producto.html, 2 pgs.
"Liebherr systems work reliably on the A380's first flight", www.liebherr.com/lh/en/5021_66442.asp, 1 pg.
Operating principle, winches-aust.com/WEBPAGES/telma/pages/Operating%20principle.htm, 2 pgs.
Installation, winches-aust.com/WEBPAGES/telma/pages/Installation.htm, 1 pg.

* cited by examiner

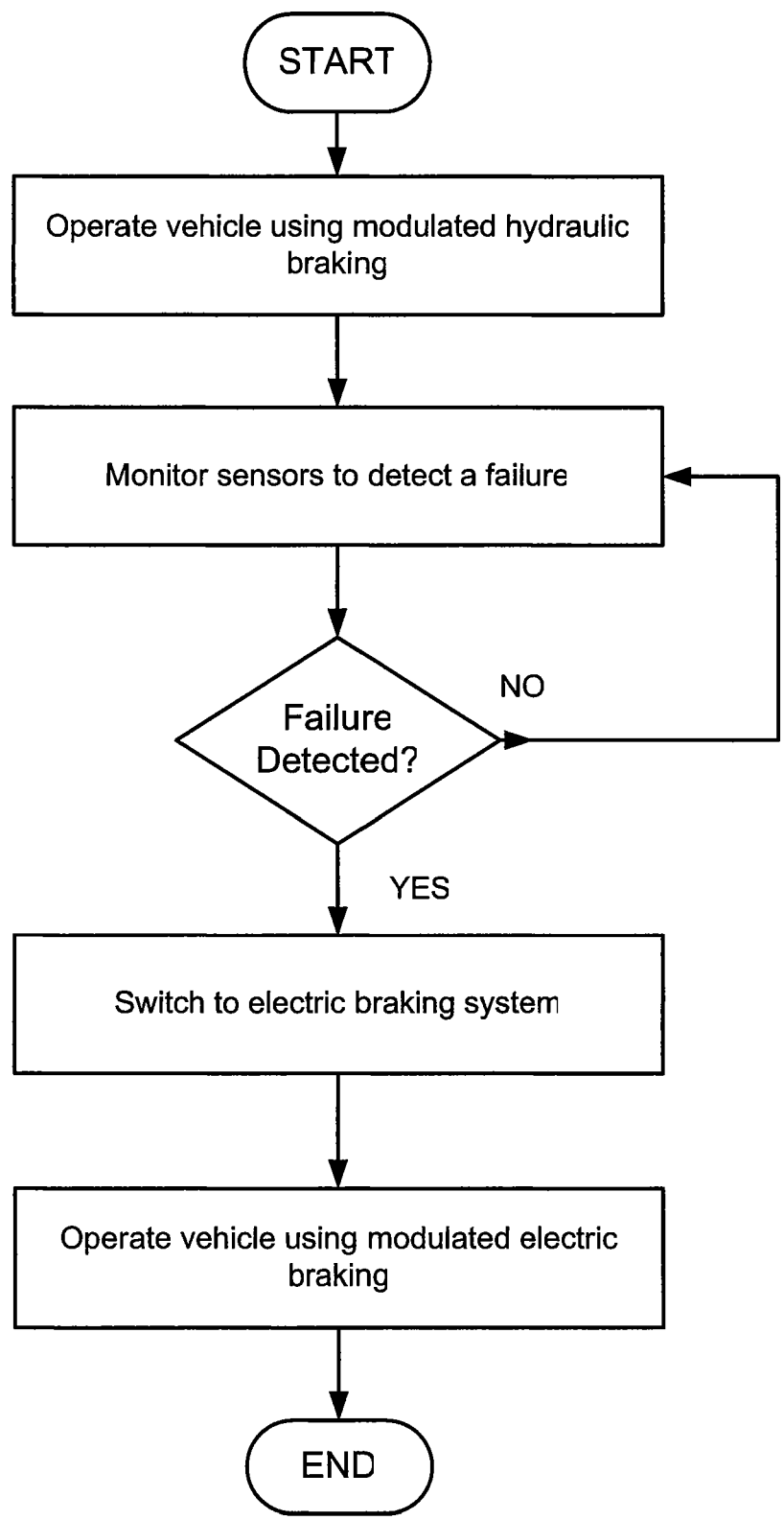

BRAKING SYSTEM

The present invention is related to a redundant braking system and a method of operating the redundant braking system. The redundant braking system provides electrically operated brakes for various types of vehicles.

On-road vehicles and off-road vehicles, for example, may range in size from less than 10,000 lbs gross vehicle weight (GVW) and smaller, and may range in size of up to 25,000 lbs GVW and greater. Brakes for vehicles (parking brakes, for example) in these size ranges may operate by acting upon an output shaft of a vehicle's transmission or transfer case, and may use a spring mechanism to engage a brake (for example, a spring mechanism of a spring brake). To release the brake, compressed air may be used to overcome a holding force of a spring of the spring mechanism. Parking braking systems may be essentially binary. That is, if a parking brake is binary, the brake is either fully engaged or fully released.

Such a braking system may also have a fail-safe feature which operates such that if air pressure is lost for any reason, the brake will immediately lock on. Once a brake is locked on, the brake may not be releasable unless air pressure is restored or a holding force of the spring mechanism is overcome by intervention, such as, for example, mechanical intervention.

Although a braking system may have a spring brake which is configured to be essentially fail-safe (locking on when air pressure is lost), such a spring brake may have some limitations as far as providing modulated braking control. Modulated braking, also referred to as progressive braking, transfers an amount of friction or braking action to the wheels or output shaft of a vehicle, which is proportional to pressure applied to a brake pedal, for example. In other words, during modulated braking, as more braking force is applied to the brake pedal, more force is applied to the wheels or output shaft of the vehicle. In a case wherein modulated braking control is not provided, the vehicle will simply come to an abrupt stop when the brake goes into fail-safe mode. This could be a significant issue for military vehicles or other applications that require operational flexibility. Operational flexibility may include capacity for continued control of the vehicle in an event of a failure of a system of the military vehicle. Operational flexibility may be achieved through the use of redundant or back-up systems, including back-up braking systems.

During a military operation, for example, if an air system of a vehicle fails or is lost due to enemy fire, or due to some other circumstance, the spring brakes may automatically lock on. In other words, the brakes are configured to "fail safe". Locking on of the spring brakes could have an undesirable effect of immobilizing the vehicle. In the military operation, for example, during any combat situation, an immobilized vehicle could become an easy target, and the safety of the vehicle, the vehicle's occupants and the vehicle cargo could be put in jeopardy.

One of the primary means of controlling the speed of a vehicle during ordinary everyday use is by using the vehicle's service brakes. The designation "service brakes" is generally used to describe modulated brakes of a vehicle which apply "as needed" force to the wheels of a vehicle during normal use of the vehicle, e.g., when the vehicle is "in service".

For military vehicles, especially tactical military vehicles, a redundant braking system may have a failure mechanism which could result in the vehicle remaining in a fully mobile and fully operable condition in the event of a failure. A tactical military vehicle may be a vehicle used within, or in direct support of, tactical forces. Tactical forces may be forces involved in support of combat operations, or to forces engaged in actual combat.

An electric redundant braking system may allow for modulated control of the vehicle (for example, modulated braking) in the event of an emergency such as a loss of service brakes or when the use of compressed air is not possible or not desirable. For example, a use of compressed air may not be desirable during operation of a hybrid-electric vehicle when the hybrid-electric vehicle is in a mode in which it uses an electric motor only. A hybrid-electric vehicle is a vehicle which uses a mixture of power and propulsion technologies such as internal combustion engines, electric motors, diesel or gasoline and batteries. When in "electric mode", hybrid-electric vehicles typically may not have a need to generate compressed air.

An electric redundant braking system may be configured to operate by acting on a vehicle's drive shaft. In the electric redundant braking system, a braking apparatus can be used as a back-up service brake in the event that the main service brakes fail or are not used for some other reason, or the redundant braking apparatus can be used as a simple parking brake. The arrangement of an assembly comprising the redundant brake at the drive shaft may be referred to as a brake apparatus or brake mechanism.

The electric redundant braking system may be implemented on a vehicle having an internal combustion (IC)—electric hybrid drive capable of being periodically operated in an electric-only mode (with the IC engine turned off). When the vehicle is operated with the IC engine turned off, use of air-assisted brakes can be problematic since the IC engine (which may be used to generate compressed air to operate the air assisted brakes) is no longer being used. When the IC engine is not used, an electric motor may be used instead.

An electrically operated brake may use the same stored electrical power that is used for vehicle propulsion during a mode in which an electric motor is used to run the vehicle instead of the IC engine. When the stored electrical power is used for vehicle propulsion, compressed air may not be needed to operate the brakes. Also, since an electric brake is usually operated only on an as needed basis, the current draw from the batteries which power the electric brake is quite low.

In one embodiment, a vehicle uses a parallel diesel hybrid-electric drive. In this exemplary embodiment, when the vehicle is powered by the internal combustion engine, the service brakes are air over hydraulic brakes. In an operation of the air over hydraulic brakes, compressed air is used to activate a master cylinder of the hydraulic system, which in turn facilitates application of a brake to each wheel of the vehicle through hydraulic pressure. In an air over hydraulic mode, a service brake pedal modulates an amount of compressed air acting on the master cylinder, thus providing an operator with a means by which to determine an amount of brake force required to control the vehicle by the familiar method of adjusting the amount of pressure applied to the brake pedal (for example, an amount of foot pressure applied to the brake pedal).

In an implementation such as the one described above, the redundant electric brake may provide a braking system having a failure mechanism which is different from and fully independent of a failure mechanism of the air over hydraulic system described above. In the air over hydraulic system, for example, a loss of air pressure or a loss of hydraulic fluid may cause the air over hydraulic system to fail. The electric system, on the other hand, may fail if electrical power is lost to the brake mechanism.

The electric redundant braking system may be implemented to operate in a back-up mode which uses modulated signals from the vehicle's brake pedal to apply the electric brake apparatus during vehicle operation to supplement or replace a non-electrical service brake. The back-up braking mode can be activated either manually by the operator using buttons, switches or a keypad, for example, or automatically activated when a service brake failure is detected. Alternatively, the back-up braking mode can be activated remotely by an operator. An operator may be a person residing in a command center, a driver of the vehicle or a passenger in the vehicle. An operator may be another device such as a smart device activating the back-up braking mode based on combinational logic.

The back-up mode may be activated either automatically or manually when a mode of operation of the vehicle is switched to a silent mode of operation. The designation "silent mode" may be used to refer to a mode in which little or no noise is produced or detectable from the vehicle. For example, when operating in silent mode, the vehicle may generate little or no engine noise or little or no brake noise. Silent mode may also be used to describe a mode in which a radar signature or thermal signature of a vehicle is very small, that is, the vehicle is not detectable by radar or heat imaging means.

The electric redundant braking system may be implemented to operate in a parking brake mode, wherein the electric brake is applied and locked into place through a ratcheting mechanism that maintains brake force even after electric power to the brake mechanism is cut. The parking brake may be operated using buttons or switches located on a dashboard of a vehicle, or located in any location which is accessible to an operator of the vehicle. The operator may be a driver, a passenger, or a controller remote from the vehicle, for example.

The electric redundant braking system may make use of sensors which are installed on the compressed air system and the master cylinder. The sensors may measure air pressure, hydraulic fluid level and/or hydraulic fluid pressure. If a predetermined amount of change occurs in either the air pressure, the hydraulic fluid level, the hydraulic fluid pressure, or any combination of the above, the system may automatically activate the electric redundant braking system using the electric brake mechanism (a disc brake, for example) on the transmission output shaft.

BRIEF DESCRIPTION OF DRAWINGS

FIG. 3 shows a flow chart for a method of operating a braking system of the present invention.

DETAILED DESCRIPTION

Embodiments of the redundant braking system will be described with reference to the drawings.

Figure 1:
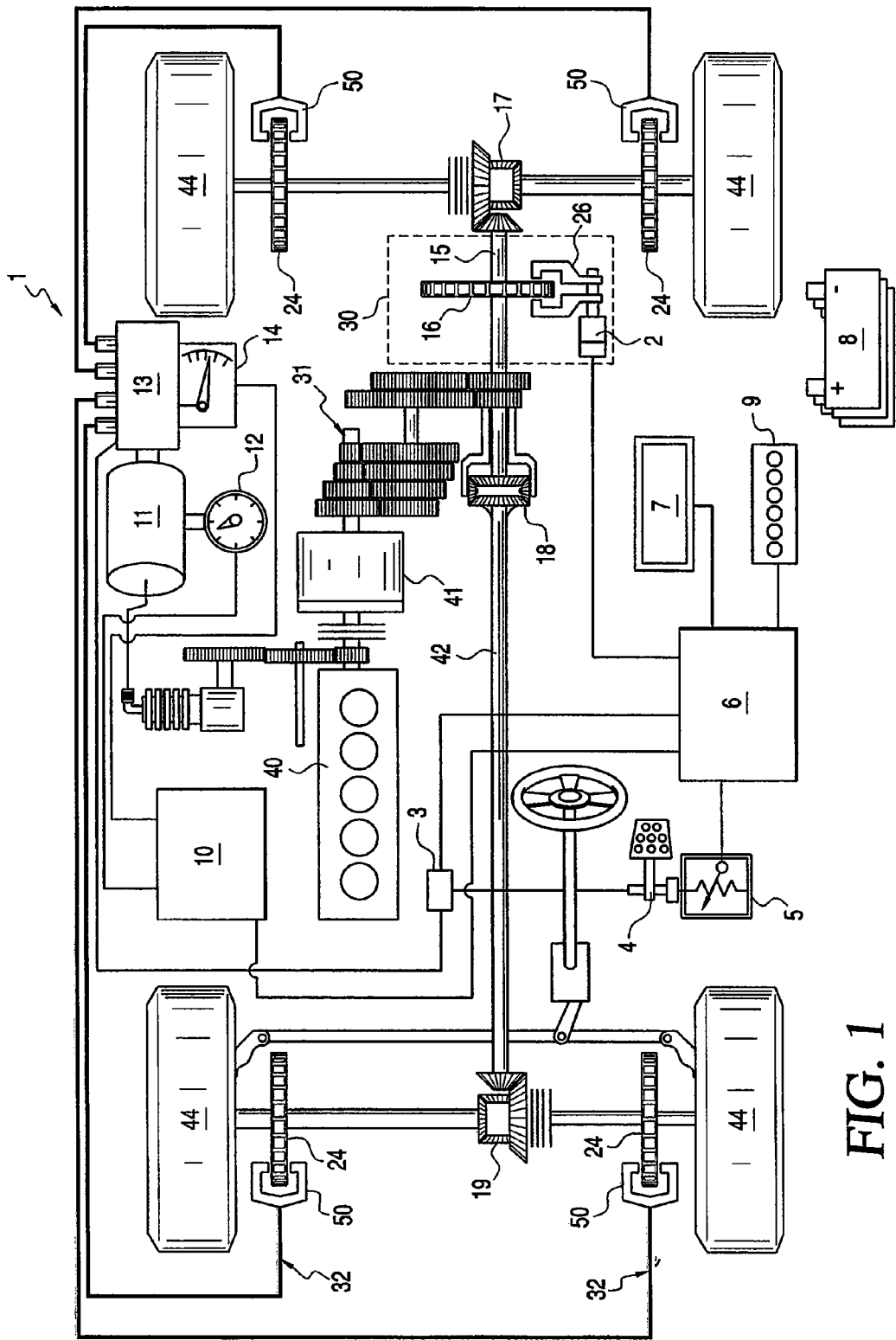
FIG. 1 shows a view of a parallel diesel hybrid-electric vehicle in which the present invention may be implemented.

For the purpose of illustration, the electric redundant braking system is described within the context of an implementation in a parallel diesel hybrid-electric vehicle 1 using a parallel diesel hybrid-electric propulsion system with 4-wheel drive as shown in FIG. 1. The electric redundant braking system may be implemented in a variety of vehicle types having differing propulsion and drive systems, and in some cases, in vehicles having propulsion and drive systems which are the same, for example, in a case which propulsion and/or drive systems are both electrical.

Referring to FIG. 1, the parallel diesel hybrid-electric vehicle 1 includes a diesel engine 40, which may be used as a primary propulsion system for the parallel diesel hybrid-electric vehicle 1, and an electric motor 41 which may be used as a back-up propulsion system for the parallel diesel hybrid-electric vehicle 1. The parallel diesel hybrid-electric vehicle 1 includes an air over hydraulic braking system 32 for the front and rear brakes. The air over hydraulic braking system 32 includes service brake pedal 4 for applying a braking force from inside the parallel diesel hybrid-electric vehicle 1. A master cylinder 13 is filled with a required level of hydraulic fluid (brake fluid). A fluid level detector 14 is installed at the master cylinder 13 to detect a fluid level in the master cylinder 13. A fluid pressure sensor may be installed at the master cylinder 13 as well, in order to detect a pressure of the fluid in the master cylinder 13. A pressure vessel 11 is connected to the master cylinder 13. A pressure sensor 12 is installed at the pressure vessel 11 to detect and transmit a pressure thereof. The fluid level detector 14 and pressure sensor 12 transmit fluid level information and pressure information to a system status monitor 10. Installed at wheels 44 are discs 24 and calipers 50.

The parallel diesel hybrid-electric vehicle 1 includes a drive shaft 42 connected to differentials 17, 18 and 19, which transfer torque to the wheels 44. The differentials 17, 18 and 19 may comprise locking differentials or slip differentials. A transfer case 31 transfers torque from either the diesel engine 40 or the electric motor 41 to the drive shaft 42, including output shaft 15. Installed on the output shaft 15 is a disc 16 on shaft, servomotor 2 and a clamp or caliper 26. The disc 16 on shaft, servomotor 2 and clamp or caliper 26 comprise a brake apparatus or brake mechanism 30. The constituent parts of brake apparatus 30 are not limited to the disc 16 on shaft, servomotor 2 and clamp or caliper 26, but may be comprised of a variety of constituent parts acting on the drive shaft 42 of the parallel diesel hybrid-electric vehicle 1 including output shaft 15. For example, another device could be used instead of the servomotor 2 to provide a force to the disc 16 on shaft to stop or reduce a rotation of the output shaft 15. For example, the braking mechanism 30 may use electromagnetic means, or an arrangement such as a toroid arrangement to stop, or reduce or modulate a rotation of the output shaft 15.

A controller 6 is connected to a brake pedal force and pressure transducer 5, which is connected to brake pedal 4. A block and bleed solenoid valve 3 is connected between the master cylinder 13 and the brake pedal 4. The block and bleed solenoid valve 3 receives an output signal from the controller 6. The controller 6 outputs operating mode or status information to a mode display 7 which displays a variety of information, including mode information such as normal mode or silent mode, and status information such as service brakes in use, park brake on, and back-up brakes in use. A hand operated mode selector switch 9 used to switch between modes. The parallel hybrid-electric vehicle 1 may have several hand operated mode selector switches 9, installed in a location convenient to the operator. The hand operated mode selector switches 9 may be used to switch between a normal operating mode and a back-up mode. The hand operated mode selector switches 9 may be used to switch to a silent mode while continuing to operate in the normal operating mode or the back-up mode. The hand operated mode selector switches 9 may be used to switch a mode of operation between the air over hydraulic brakes to the electric brake apparatus. A battery or batteries 8 may be used to power the entire vehicle including the electric braking system. The energy source for the electric redundant braking system is not limited to batteries only. Rather, the energy source for the electric redundant braking system may be any source capable of providing electric power.

The brake pedal 4, brake pedal force and pressure transducer 5, controller 6, mode display 7, mode selector switches 9, batteries 8, system status monitor 10, servomotor 2 and braking mechanism 30 comprise an electric braking system, and the electric braking system is substantially or completely separate from the air over hydraulic braking system.

Figure 2:
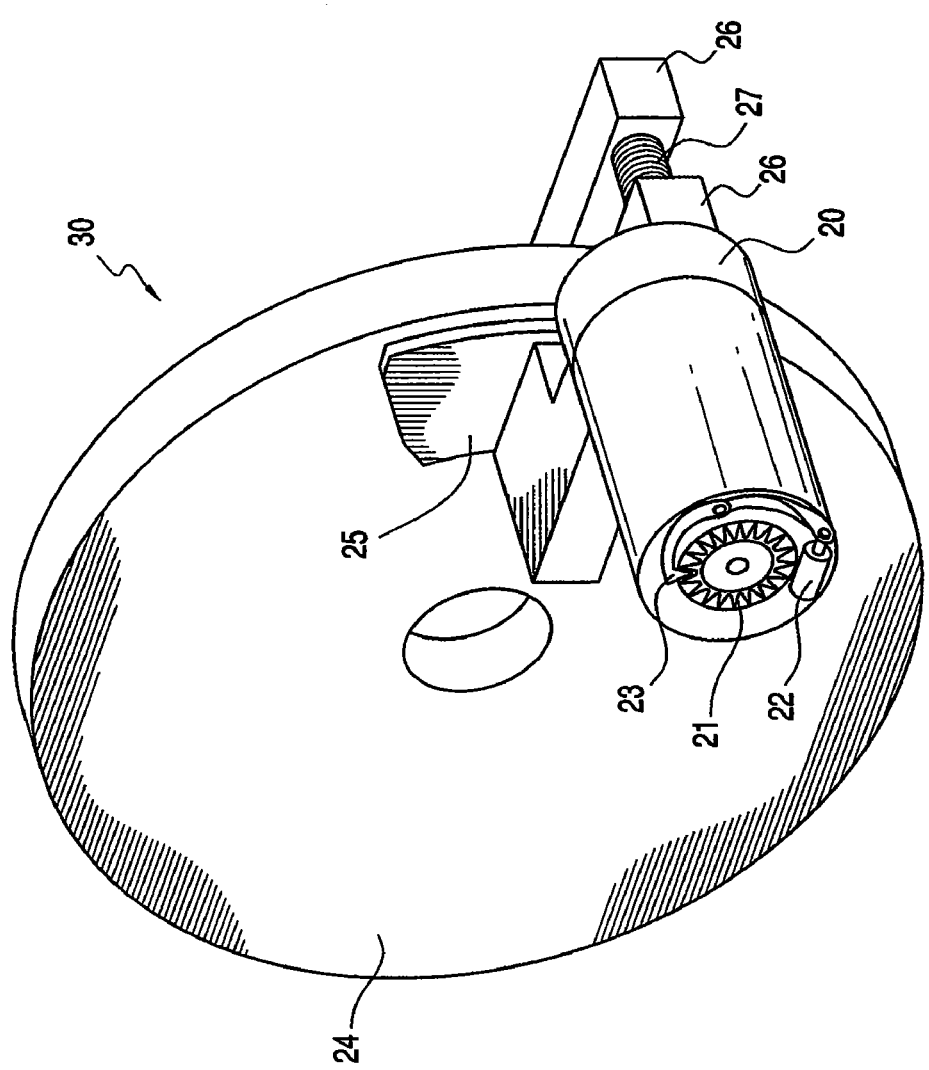
FIG. 2 shows the electric brake components of the present invention in greater detail, including the parking brake ratcheting mechanism.

FIG. 2 provides a more detailed view of the parking brake mechanism 30. Referring to FIG. 2, servomotor 2 is connected to clamps 26 which apply pressure to parking brake pads 25. These in turn apply pressure to disc at wheels 24. The ratchet paw 23 engages with ratchet gear 21 which maintains its locked position even when the servomotor 20 is de-energized, and thus the parallel hybrid-electric vehicle 1 may not be movable unless the ratchet paw 21 is disengaged. The solenoid 22 engages and disengages the ratchet paw 21. The mode selector switch 9 may be used to send a signal to the solenoid 22 to disengage the ratchet paw. The signal from the mode selector switch 9 releases the parking brake, and then the parallel hybrid-electric vehicle 1 can be operated using modulated braking control. The parking brake may also be manually released. For example, ratchet paw 21 may be connected to a wire, and the wire may be connected to a push-pull mechanism or lever located inside the parallel hybrid-electric vehicle 1. A push or pulling action on the mechanism or lever releases the parking brake.

For added parking brake effectiveness, it is preferred that the three differentials 17, 18 and 19 be of a locking differential type or be of the limited-slip differential type. The electric redundant braking system can also be implemented on a 4-wheel drive system without the center differential 18 or in a 2-wheel drive vehicle with a single rear differential 17. For added effectiveness, all of the differentials used may be locking type differentials, or be limited-slip type differentials.

An operation of the redundant braking system will now be described.

In one embodiment, when the parallel diesel hybrid-electric vehicle 1 is operating in a normal operating mode and being propelled under the power of diesel engine 40, the brakes in use are the air over hydraulic brakes 32. During operation, an operator may use mode selector switch 9 to switch to a silent mode. In silent mode, propulsion power for the parallel diesel hybrid-electric vehicle 1 may be provided by the electric motor 41. For operation in silent mode, the controller 6 may be configured to automatically switch to a back-up mode in which the only braking system in use is the electric braking system, whereby the braking mechanism 30 applies a modulated braking force to the output shaft 15. When the controller 6 switches to the electric braking system, it also outputs a signal to the block and bleed solenoid valve 3 to close, and thereby block a master cylinder 13 side of the block and bleed solenoid valve 3. Simultaneously, the block and bleed solenoid valve 3 vents or bleeds the brake pedal 4 side to atmosphere. This prevents simultaneous operation of both the air over hydraulic brakes 32 and the electric braking system. Alternatively, the controller 6 may be programmed to leave block and bleed solenoid valve 3 open, thereby allowing simultaneous operation of both the air over hydraulic brakes and the electric brakes. In such a case, the electric brakes would serve as auxiliary modulated brakes.

When the parallel hybrid-electric vehicle 1 is switched to silent mode and the electric braking system is also in use, the mode display 7 indicates that the parallel diesel hybrid-electric vehicle 1 is operating in silent mode and that the electric brake system is in use. During modulated braking control, the brake pedal 4 and the brake pedal force and pressure transducer 5 employ necessary feedback systems to give a vehicle operator the same "feel" at the brake pedal that was present during the normal mode in which the air over hydraulic brakes were being used.

In another embodiment, when the parallel diesel hybrid-electric vehicle 1 is operating in a normal operating mode and being propelled under the power of diesel engine 40, the brakes in use are the air over hydraulic brakes 32. During operation of the parallel hybrid-electric vehicle 1, the pressure sensor 12 and/or the level sensor 14 detects an abnormal condition such as low pressure or a low level. A low pressure and/or low level signal are transmitted to the system status monitor 10, which transmits low pressure or low level signal information to the controller 6. In response, the controller 6 switches a mode of operation from the air over hydraulic braking system to the electric braking system.

When the controller 6 switches a mode of operation from the air over hydraulic braking system, the mode display 7 indicates that the electric brake system is in use. The mode display 7 may also provide an audible signal, such as beeping sound, to inform that a mode of operation has changed. During modulated braking control, the brake pedal 4 and the brake pedal force and pressure transducer 5 employ necessary feedback systems to give a vehicle operator the same "feel" at the brake pedal that was present during the normal mode in which the air over hydraulic brakes were used.

In another embodiment, when the parallel diesel hybrid-electric vehicle 1 is operating in a normal operating mode and being propelled under the power of diesel engine 40, the brakes in use are the air over hydraulic brakes 32. During operation, an operator of the parallel diesel hybrid-electric vehicle 1 may use mode selector switch 9 or a remote means to manually switch the vehicle operation to silent mode. The controller detects that the vehicle operation has now been switched to silent mode, and then informs the operator via the mode display 7.

However, in this instance, the system does not automatically switch from the air over hydraulic braking system to the back-up electric braking system. Rather, the operator manually switches to the back-up electric braking system.

When the operator manually switches to the back-up electric braking system, the mode display 7 indicates that the parallel diesel hybrid-electric vehicle 1 is operating in silent mode and that the electric brake system is in use. The mode display 7 may also provide an audible signal, such as beeping sound, to inform that a mode of operation has changed. During modulated braking control, the brake pedal 4 and the brake pedal force and pressure transducer 5 employs necessary feedback systems to give a vehicle operator the same "feel" at the brake pedal that was present during the normal mode in which the air over hydraulic brakes were used.

When the operator of the parallel diesel hybrid-electric vehicle 1 presses on the brake pedal assembly 4, the force applied to the brake pedal assembly and position information of the brake pedal assembly are converted to an electrical signal, which the controller 6 provides to the servomotor 2, which then applies a clamping force to the disc 16 on shaft in proportion to the force applied by the operator to the brake pedal assembly 4 and in proportion to the resultant amount of travel of the brake pedal assembly 4.

For a parking brake mode of operation, the operator of the parallel diesel hybrid-electric vehicle 1 may manually activate the parking brake using the mode selector switch 9, which sends a signal to the servomotor 2 via controller 6 to apply the maximum available clamping force to the disc 16 on shaft. When the parking brake circuit is energized, the mode display 7 provides an indication that the parking brake is in use. The mode display 7 may also provide an audible signal, such as beeping sound, to inform that a mode of operation has changed.

A method of operating a braking system of an embodiment of the present invention is shown in FIG. 3. In the flowchart of FIG. 3, a vehicle is normally operated using modulated hydraulic braking. During operation, the hydraulic braking system is monitored in order to detect a failure. If a failure is not detected, the vehicle continues to operate using the hydraulic brakes. If a failure is detected, the braking system is switched to the electric braking system. The vehicle then operates using modulated electric braking control via the braking mechanism 30 acting on a drive shaft of the parallel hybrid-electric vehicle 1.

A braking system for a vehicle in one embodiment may comprise a hydraulic braking system configured to apply brake force through a first brake apparatus, a modulated electric braking system completely separate from the hydraulic braking system and configured to apply brake force through a second brake apparatus, and a control system for monitoring a status of said hydraulic braking system and automatically switching to the modulated electric braking system from the hydraulic braking system during vehicle travel when the hydraulic braking system fails.

In another embodiment, a braking system for a vehicle under control of an operator may comprise a hydraulic braking system, a modulated electric braking system completely separate from the hydraulic braking system, an operator actuated switch for switching the vehicle to a silent mode of operation, and a controller for switching from the hydraulic braking system to the modulated electric braking system responsive to actuation of the switch.

A method of operating a braking system of a vehicle in one or more embodiments may comprise sensing a failure of a hydraulic braking system during vehicle travel, and automatically actuating an electric braking system responsive to said sensing to provide modulated electric braking during continued vehicle travel, the electric braking system being completely separate from the hydraulic braking system, wherein the hydraulic braking system applies modulated force through a first brake apparatus, the electric braking system applies modulated force through a second brake apparatus, and the first brake apparatus is completely independent of the second brake apparatus.

While the invention has been particularly shown and described with reference to the preferred embodiments thereof, it will be understood by those skilled in the art that various changes and modifications may be made without departing from the spirit and scope of the invention.

What is claimed is:

1. A system for braking a truck, the system comprising:
   a foot brake pedal configured to receive a continuously variable force applied to the foot brake pedal;
   a transducer operatively coupled to the foot brake pedal and configured to convert the continuously variable force to an electronic signal of a magnitude proportional to the continuously variable force;
   a brake force apparatus located on an input side of a torque transfer unit and configured to apply brake force to a drive shaft of the truck, the brake force apparatus including a disc brake attached directly to the drive shaft;
   a control unit configured to control the brake force apparatus to apply continuously variable modulated brake force to the drive shaft of the truck via the disc brake in an amount proportional to the continuously variable force applied to the foot brake pedal;
   means for transmitting the electronic signal from the transducer to the control unit; and
   a finger-actuated button accessible to a driver of the truck, the button configured to set a mode of the system to a non-modulated parking brake mode in which the control unit causes the brake force apparatus to apply and maintain a ratcheted force to the drive shaft of the truck, the ratcheted force being maintained at a constant level even if the truck is powered off.

2. A system for braking a vehicle, the system comprising:
   an operator-actuated switch for selecting a silent mode of operation of the vehicle;
   a foot brake pedal configured to receive a continuously variable force applied to the foot brake pedal; and
   a modulated brake force apparatus configured to act directly on a drive shaft of the vehicle and provide continuously variable braking force to the drive shaft in response to the continuously variable force applied to the foot brake pedal and in response to activation of the operator-actuated switch for selecting a silent mode of operation of the vehicle.

3. The system of claim 2, further including an operator-actuated switch for setting a mode of the system to a non-modulated parking brake mode, and further comprising a parking brake apparatus configured to act on the drive shaft in the non-modulated parking brake mode.

4. The system of claim 3, wherein the parking brake apparatus is configured to apply a constant force to the drive shaft once the operator-activated switch is actuated.

5. The system of claim 4, wherein said parking brake apparatus comprises a ratcheting mechanism.

6. The system of claim 3 wherein the operator-activated switch comprises a finger-actuated button in electronic communication with the parking brake apparatus via an electronic controller.

7. The system of claim 2 wherein the modulated brake force apparatus is a disc brake attached directly to the drive shaft of the vehicle.

8. The system of claim 7 further comprising a hydraulic system configured to convert the continuously variable force applied to the brake pedal to a continuously variable force applied to the disc brake attached directly to the drive shaft of the vehicle.

9. The system of claim 7 further comprising an electronic system configured to convert the continuously variable force applied to the brake pedal to a continuously variable force applied to the disc brake attached directly to the drive shaft of the vehicle.

10. The system of claim 2, wherein the modulated brake force apparatus is located on an input side of a torque transfer unit.

11. The system for modulated braking of claim 2, wherein the modulated brake force apparatus includes a brake selected from a drum brake and a disc brake attached directly to the drive shaft.

12. The system for modulated braking of claim 2, further comprising slip differentials.

13. The system for modulated braking of claim 2, further comprising locking differentials.

* * * * *